J. DE W. HILL.
AIRPLANE.
APPLICATION FILED MAY 9, 1919.
1,347,857.
Patented July 27, 1920.
2 SHEETS—SHEET 1.
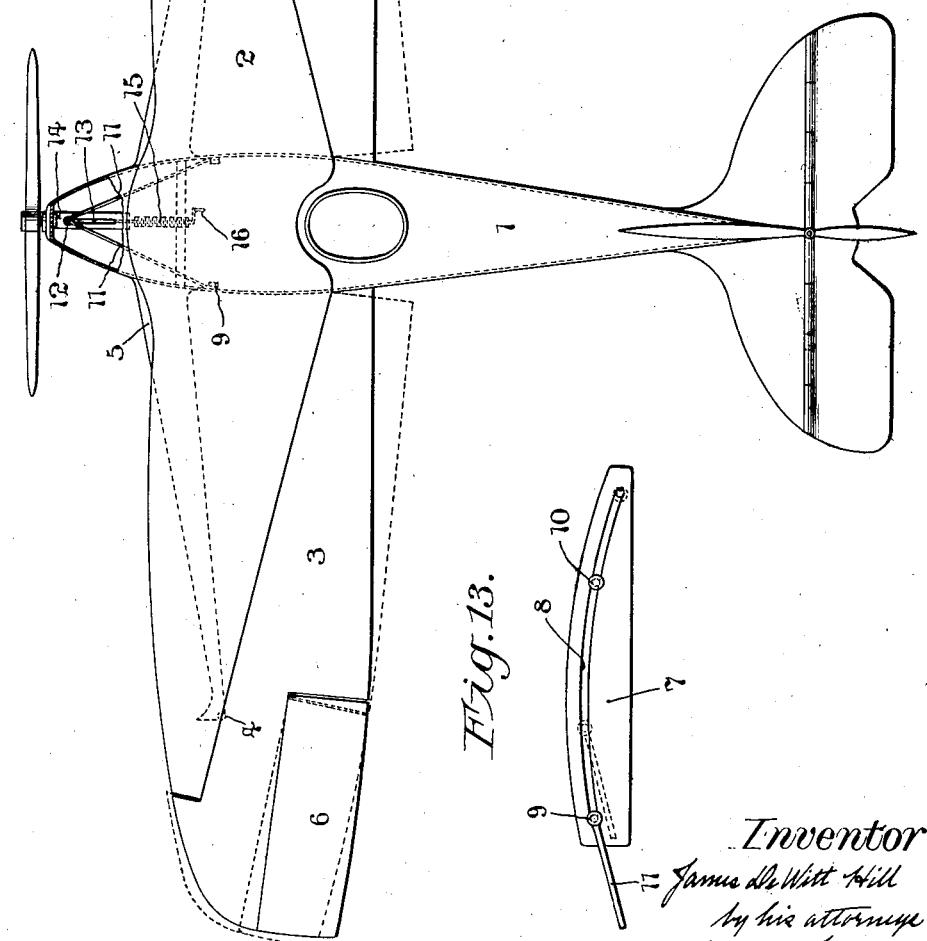
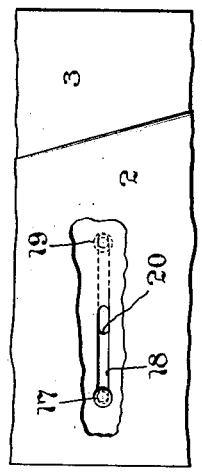
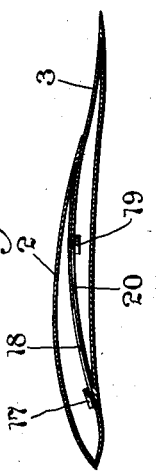
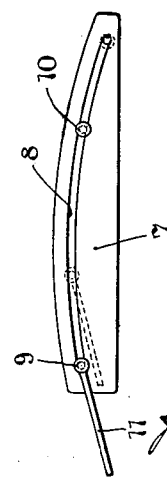
Inventor:
James DeWitt Hill
by his attorneys
Brown Seward

J. DE W. HILL.
AIRPLANE.
APPLICATION FILED MAY 9, 1919.

1,347,857.

Patented July 27, 1920.
2 SHEETS—SHEET 2.

Inventor:
James De Witt Hill
by his attorneys
Brown & Seward

UNITED STATES PATENT OFFICE.

JAMES DE WITT HILL, OF SCOTTDALE, PENNSYLVANIA.

AIRPLANE.

1,347,857. Specification of Letters Patent. Patented July 27, 1920.

Application filed May 9, 1919. Serial No. 295,949.

*To all whom it may concern:*

Be it known that I, JAMES DE WITT HILL, a citizen of the United States, and resident of the city of Scottdale, county of Wyoming, and State of Pennsylvania, have invented a new and useful Improvement in Airplanes, of which the following is a specification.

It is known that in a given airplane with a certain motive power, the maximum speed can be obtained with wings of small area having a rather flat degree of curvature and a small angle of incidence. Therefore, if the area, the degree of curvature and the angle of incidence of the wings be increased or decreased within practical limits, the carrying power of the airplane will be increased or decreased and its speed will be correspondingly decreased or increased.

My invention comprises improvements in the wing structure of an airplane whereby a wide range of flight requirements may be obtained in a single airplane, a single means being provided for simultaneously varying the area, the degree of curvature and the angle of incidence of the wings, the wings each comprising fixed and movable overlapping wing members, the movable wing members being adjustable with respect to the fixed wing members.

A further object of my invention is to provide means which can be operated, while the airplane is in motion, for simultaneously adjusting the movable wing members to suit different requirements.

A practical embodiment of my invention is represented in the accompanying drawings in which, Figure 1 represents in top plan my improvement applied to an airplane of the monoplane type, the wings being shown contracted in full lines and extended in dotted lines.

Fig. 2 represents on an enlarged scale a top plan view of one of the airplane wings.

Figs. 3 to 10 inclusive represent cross sections in the planes of lines III—III to X—X inclusive of Fig. 2.

Figs. 11 and 12 are detail plan and cross sectional views showing the pin and slot connections between the overlapping members of the wing.

Fig. 13 is a detail view showing a part of the means for adjusting the movable wing members.

Figure 2:
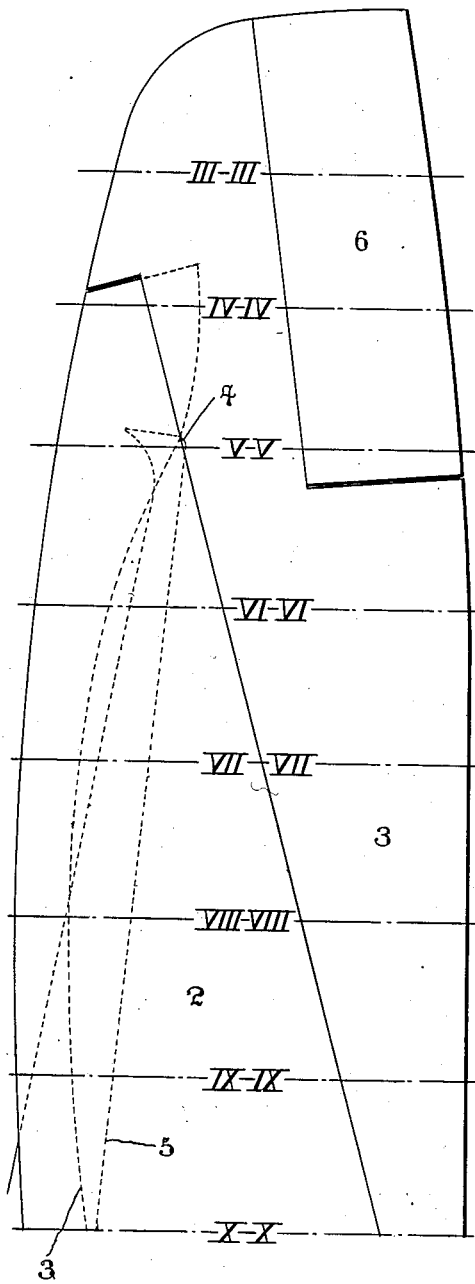
Figure 3:
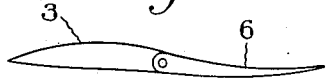
Figure 4:
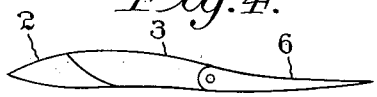
Figure 5:
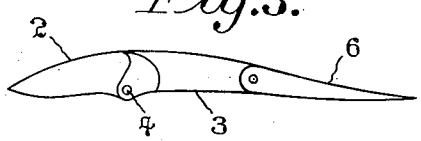
Figure 6:
Figure 7:
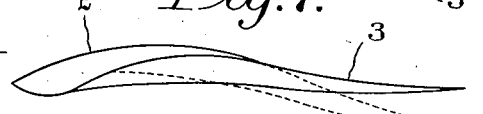
Figure 8:
Figure 9:
Figure 10:
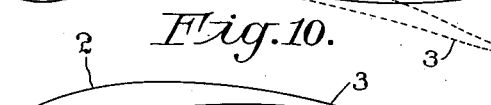

The body of the airplane is denoted by 1. Each of the wings comprises longitudinally disposed fixed and movable overlapping members 2 and 3. These wings are of substantially rigid construction and are transversely curved. The movable wing members 3 are pivotally connected at 4 to the fixed wing members 2 at a distance inwardly from the ends of the wings and suitable supporting struts 5 lead from the body 1 to said pivotal connections.

The movable wing members are provided with the usual ailerons 6 controlled by any well known or approved means from the body of the machine.

The fixed and movable overlapping wing members have coacting curved bearing surfaces.

In the embodiment shown, the curved bearing surfaces are conical and extend both sides of the pivotal connection 4, the conical surfaces of the movable wing member being convex inside and concave outside the said pivotal connection.

This arrangement causes the movable wing members as they are extended, to move to not only increase the area of the wings, but also to increase the degree of curvature and to increase the angle of incidence.

One means for simultaneously adjusting the movable wing members is herein shown, which means comprises side plates 7 in the body 1 adjacent to the inner ends of the movable wing members, which side plates have curved elongated slots 8 in which the studs 9 and 10 projecting from the inner ends of the movable wing members travel. Rigid "push and pull" rods 11 are connected at their rear ends to the studs 9 and at their forward ends to a pin 12 traveling in an elongated slot 13 in a plate 14, carried within the body of the airplane. This pin 12 is moved back and forth to any desired point to simultaneously adjust the movable wing members, by means of a hand screw 15 provided with a handle 16 within reach of the operator.

To keep the bearing surfaces between the fixed and movable members in close contact, I preferably provide the pin and slot connections 17, 18 and 19, 20 at intervals along the wings. To prevent chattering, it is preferable to reverse these pin and slot connections, viz.; to have the pin of one connection and the slot of the other connection in one wing member and the coacting parts in the other wing member.

It is to be understood that the wings may be made of any suitable material and reinforced as desired.

From the above description it will be seen that an airplane provided with my invention may have its wings adjusted to obtain a wide range of flight requirements, from a high speed and small carrying power to a low speed and great carrying power.

The wings may be set in position to permit the airplane to glide at a steep angle without excessive speed, thus making it possible to glide into a restricted space over high obstacles.

It is known that an airplane that has a flat gliding angle picks up great speed when put into a steep glide and even though it comes in over high obstacles and comes close to the ground, it cannot land in a restricted space on account of its great speed. By my invention, the wings can be set for a low flying speed and the landing speed will therefore be correspondingly low. Since the wings can be set at a large angle of incidence for landing and since this angle is further increased as the tail of the airplane comes to the ground, the wing will form an effective brake to stop the forward travel of the plane and the machine will consequently have a short roll after landing. By my invention also the wings can be adjusted in form and area to the particular load to be carried. Furthermore, when the wings are set for a low flying speed, the engine will be allowed a greater time within which to lift the machine over an obstacle a fixed distance away. In other words it steepens the angle but not necessarily the rate of climb, thus facilitating the getting out of a restricted space.

What I claim is:

1. In an airplane, wings, each comprising longitudinally disposed fixed and movable overlapping members pivotally connected and having coacting conical bearing surfaces, said movable member being adjustable to different positions relative to the fixed member.

2. In an airplane, wings, each comprising longitudinally disposed fixed and movable overlapping members pivotally connected and having coacting conical bearing surfaces, said movable member being adjustable to different positions relative to the fixed member, and means to simultaneously adjust the movable wing members.

3. In an airplane, wings, each comprising longitudinally disposed fixed and movable overlapping members pivotally connected and having coacting conical bearing surfaces, said movable wing member being adjustable to vary the wing area.

4. In an airplane, wings, each comprising longitudinally disposed fixed and movable overlapping members pivotally connected and having coacting conical bearing surfaces, said movable wing member being adjustable to vary the area and degree of curvature of the wing.

5. In an airplane, wings, each comprising longitudinally disposed fixed and movable overlapping members pivotally connected and having coacting conical bearing surfaces, said movable wing member being adjustable to vary the area and angle of incidence of the wing.

6. In an airplane, wings, each comprising longitudinally disposed fixed and movable overlapping members pivotally connected and having coacting conical bearing surfaces, said movable wing member being adjustable to vary the area, degree of curvature and angle of incidence of the wing.

In testimony, that I claim the foregoing as my invention, I have signed my name this 21st day of April, 1919.

JAMES DE WITT HILL.